("United States Patent" [12])
Ehring et al.

(10) Patent No.: US 11,280,722 B2
(45) Date of Patent: *Mar. 22, 2022

(54) OPTICAL FLOW CELL

(71) Applicant: Cytiva Sweden AB, Uppsala (SE)

(72) Inventors: Hanno Ehring, Uppsala (SE); Mats Lundkvist, Uppsala (SE); David Carl Martin Bergman, Uppsala (SE); Andreas Marcstrom, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/056,543

(22) PCT Filed: May 29, 2019

(86) PCT No.: PCT/EP2019/064119
§ 371 (c)(1),
(2) Date: Nov. 18, 2020

(87) PCT Pub. No.: WO2019/229201
PCT Pub. Date: Dec. 5, 2019

(65) Prior Publication Data
US 2021/0208058 A1    Jul. 8, 2021

(30) Foreign Application Priority Data
May 29, 2018   (GB) ..................... 1808748

(51) Int. Cl.
*G01N 21/00* (2006.01)
*G01N 21/05* (2006.01)
*G01N 21/03* (2006.01)
*G01N 21/85* (2006.01)

(52) U.S. Cl.
CPC ......... *G01N 21/05* (2013.01); *G01N 21/0303* (2013.01); *G01N 21/85* (2013.01); *G01N 2201/08* (2013.01)

(58) Field of Classification Search
CPC ............... G01N 21/8507; G01N 21/31; G01N 21/0303; G01N 21/59; G01N 21/05
(Continued)

(56) References Cited

U.S. PATENT DOCUMENTS 5,124,130 A    6/1992   Costello et al.
7,673,257 B1   3/2010   Ehring et al.
(Continued)

FOREIGN PATENT DOCUMENTS

CN    204679411 U    9/2015
EP    0333939 A2     12/1988
(Continued)

OTHER PUBLICATIONS

PCT International Search Report and Written Opinion for PCT/EP2019/064119 dated Jul. 11, 2019 (9 pages).
(Continued)

*Primary Examiner* — Md M Rahman
(74) *Attorney, Agent, or Firm* — Eversheds Sutherland (US) LLP

(57) ABSTRACT

Disclosed is an optical flow cell (300') comprising: a housing (910) forming; an enclosed and elongated fluid channel (920) arranged along a first axis (923); a first light guide (961) and a second light guide (962) generally concentrically arranged along a second axis (970) and on opposite side walls of the fluid channel, said first and second light guides having ends (961c,962c) removed in situ to provide a sensing gap (d).

15 Claims, 9 Drawing Sheets

(58) Field of Classification Search
USPC .......................................................... 356/436
See application file for complete search history.

(56) References Cited

U.S. PATENT DOCUMENTS

| | | | |
|---|---|---|---|
| 2002/0154309 A1 | 10/2002 | Walker et al. | |
| 2010/0182606 A1* | 7/2010 | Prenner | G01N 21/645 356/440 |
| 2012/0300206 A1 | 11/2012 | Haran et al. | |
| 2012/0327397 A1* | 12/2012 | Tormod | G01N 21/05 356/51 |

FOREIGN PATENT DOCUMENTS

| | | |
|---|---|---|
| EP | 1764608 A2 | 3/2007 |
| JP | 2005221327 A | 8/2005 |
| JP | 2006-125959 A | 5/2018 |
| KR | 1020160137019 | 11/2016 |
| WO | 2011093775 A1 | 8/2011 |
| WO | 2018100032 A1 | 6/2018 |

OTHER PUBLICATIONS

Great Britain Search Report for GB Application No. 1620266.5 dated May 11, 2017 (4 pages).
Great Britain Search Report for GB Application No. 1808748.6 dated Aug. 1, 2018 (3 pages).
Chinese Office Action for GN Application No. 201780084972.5 dated Jun. 3, 2021 (28 pages with English translation).
JP Office Action dated Aug. 10, 2021 with English Translation (10 pages).

* cited by examiner

750

760 inserting light guides into an optical flow cell housing along a second axis from opposing directions and fixing the same in place

770 removing end portions of the light guides by means of a cutter, to form a first light guide having an exit surface, where light is emitted, and a second light guide having an entrance surface, where the emitted light is received, and first and second light guides having a predetermined gap, equal to or greater than the cutting width of the cutter

Fig. 8

OPTICAL FLOW CELL

CROSS REFERENCE TO RELATED APPLICATIONS

This application claims the priority benefit of PCT/EP2019/064119, filed on May 29, 2019, which claims the benefit of Great Britain Application No. 1808748.6, filed on May 29, 2018, the entire contents of which are incorporated by reference herein.

TECHNICAL FIELD

The present invention relates to an optical flow cell. The invention further relates to a corresponding method to produce an optical flow cell, a measuring device comprising the optical flow cell, a corresponding method thereof, a computer program, a computer program product and a carrier.

BACKGROUND

Optical measuring devices are used within a plurality of technical fields where a solution is allowed to flow across an optical flow cell that serves to determine the presence of a substance and/or a concentration of a substance within the solution. Examples of such technical fields are fluid chromatography and filtering, among others.

The flow cells used in the measuring devices are generally optical flow cells, having a first light guide, such as an optical fiber, with an exit surface where light is emitted and a second light guide with an entrance surface where light is received. The path length or distance between the exit surface and entrance surface can be relatively long for solutions of lower concentration, but in order to achieve reliable detection also for solutions of high concentration the distance should be smaller, typically in the range of 0.1-0.5 mm. To achieve satisfactory quality of measurements, the distance must be kept constant and is typically not allowed to deviate from a set value more than 5%.

A common problem within this area is that cleaning or service operations, of the measuring device, is cumbersome, complex and time consuming. Cleaning or service operations are typically is required when changing from one substance to another to avoid contamination. A further problem is that after cleaning or service operations corrections or adjustments involving cumbersome calibration operations before normal operation can resume. A further problem is that various cleaning or service operations affects the environment the optical flow cell is exposed to and may alter the path length or distance between the exit surface and entrance surface of the device, e.g. after being exposed to high/low temperatures, radiation or air pressure. A further problem is that the dimension path length or distance between the exit surface and entrance surface variability is greater when optical flow cells made from polymers are used. A further problem is that the sensitivity to the path length or distance variability is higher when the path length is short.

There is therefore a need for an improved optical flow cell for measuring devices to overcome this drawback.

OBJECTS OF THE INVENTION

An objective of embodiments of the present invention is to provide a solution which mitigates or solves the drawbacks and problems of conventional solutions.

SUMMARY OF THE INVENTION

The above and further objectives are achieved by the subject matter of the independent claims. Further advantageous implementation forms of the invention are defined by the dependent claims.

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

The above objectives are solved by the subject matter of the independent claims. Further advantageous implementation forms of the present invention can be found in the dependent claims.

According to a first aspect of the invention, an optical flow cell is provided comprising a housing forming an enclosed and elongated fluid channel arranged along a first axis, an inlet arranged to connect a first outer surface area of the housing to a first end of the fluid channel and an outlet arranged to connect a second outer surface area to a second end of the fluid channel, a first light guide and a second light guide concentrically arranged along a second axis and on opposite side walls of the fluid channel. In a first embodiment of the first aspect, the first light guide comprises an exit surface, where light is emitted, arranged adjacent to the first side wall of the fluid channel, and wherein the second light guide comprises an entrance surface, where the emitted light is received, arranged adjacent to a second opposing side wall of the fluid channel, wherein the exit surface and the entrance surface is separated by a distance.

An advantage of the first aspect is that it allows for and/or enable cutting a continuous light guide along the first axis to form a first and second light guide and/or cutting the continuous light guide in a motion perpendicular to the first axis to form a first and second light guide, such that the first and second light guide are separated by a desired path length and/or distance.

In an embodiment, the housing may be a single use and/or disposable optical flow cell 100 made from polymer and/or metal. An advantage of this embodiment is that optical flow cell measurement complexity can be reduced and setup times for measurements can be reduced by using a single use and/or disposable optical flow cell 100, thus eliminating the need for cleaning or service operations.

An advantage of this embodiment is that optical flow cell measurement complexity can be reduced and setup times for measurements can be reduced by using a single use and/or disposable optical flow cell, thus eliminating the need for cleaning or service operations.

According to a second aspect of the invention, a method of producing the optical flow cell according to the first aspect is provided, the method comprising inserting a continuous light guide into an optical flow cell housing along a second axis removing a portion of the continuous light guide to form a first light guide having an exit surface, where light is emitted, and to form a second light guide having an entrance surface, where the portion have a length equal to a distance such that the exit surface and the entrance surface after removing the portion is separated by the distance.

According to a third aspect of the invention, a method performed by a measuring device comprising the optical flow cell according to the first aspect is provided, the method comprising obtaining environment data indicative an environment the optical flow cell has been subjected to, measuring a light absorption value of the optical flow cell indicative of absorption of light emitted from an exit surface of a first light guide to an exit surface of a second light guide and generating a compensated light absorption value based on the light absorption value and a compensation function dependent on the environment data.

At least one advantage of this aspect is that the measurement quality of the flow cell is improved.

According to a fourth aspect of the invention, a measuring device is provided and configured for compensating a light absorption value measured in an optical flow cell, the device comprising an optical flow cell according to the first aspect. The measuring device further comprises a light generator configured to emit light within a bandwidth to the first light guide. The measuring device further comprises an absorption value generator configured to receive reference light from the light generator and received light from the optical flow cell 100. The measuring device further comprises a flow cell control unit, the unit comprising a processor, and a memory, said memory containing instructions executable by said processor, whereby said flow cell control unit is operative and/or configured to perform the method according to the first aspect.

According to a fifth aspect, a computer program is provided and comprising computer-executable instructions for causing the measuring device when the computer-executable instructions are executed on a processing unit comprised in the measuring device, to perform the method according to the third aspect.

According to a sixth aspect, a computer program product is provided and comprises a computer-readable storage medium, the computer-readable storage medium having the computer program according to the fifth aspect embodied therein.

According to a seventh aspect, a carrier is provided and contains the computer program according to the fifth aspect, wherein the carrier is one of an electronic signal, optical signal, radio signal, or computer readable storage medium.

Further applications and advantages of embodiments of the invention will be apparent from the following detailed description.

The scope of the invention is defined by the claims, which are incorporated into this section by reference. A more complete understanding of embodiments of the applications and advantages of the invention will be afforded to those skilled in the art, as well as a realization of additional advantages thereof, by a consideration of the following detailed description of one or more embodiments. Reference will be made to the appended sheets of drawings that will first be described briefly.

The advantages of the second aspect to the seventh aspect are at least the same as those for the first aspect.

BRIEF DESCRIPTION OF THE DRAWINGS

FIGS. 8 and 9 show an alternative method and another embodiment of the invention.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
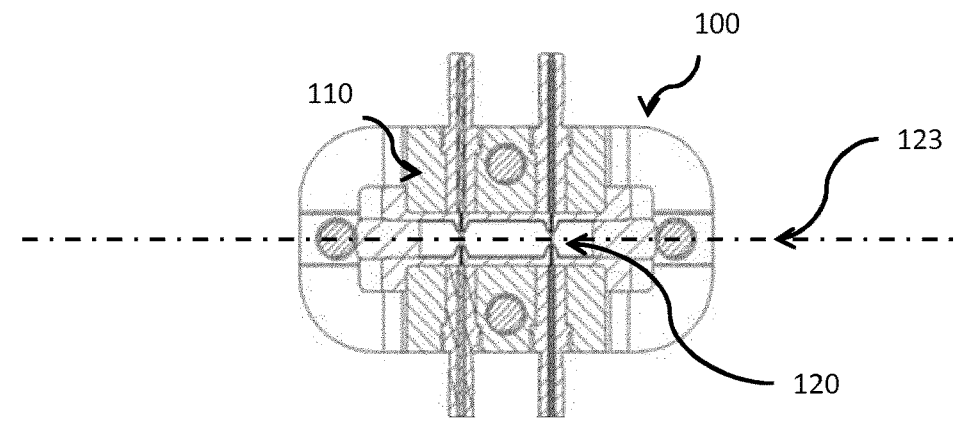
FIG. 1A-C shows various views of an optical flow cell according to an embodiment of the present invention.

FIG. 1A shows plan view of an optical flow cell 100 according to an embodiment of the present invention. The optical flow cell may comprise a housing 110 forming an enclosed and elongated fluid channel 120 arranged along a first axis 122. An advantage of the enclosed and elongated fluid channel is that it allows for cutting a continuous light guide along the first axis 123 to form a first and second light guide and/or cutting the continuous light guide in a motion perpendicular to the first axis 123 to form a first and second light guide, such that the first and second light guide are separated by a path length and/or distance.

In an embodiment, the housing may be a single use and/or disposable optical flow cell 100 made from polymer and/or metal. An advantage of this embodiment is that optical flow cell measurement complexity can be reduced and setup times for measurements can be reduced by using a single use and/or disposable optical flow cell 100, thus eliminating the need for cleaning or service operations.

In an example, when manufacturing the optical flow cell 100 a continuous light guide may be arranged across the elongated fluid channel 120, e.g. when molding the housing or by making a through hole crossing the first axis 123 through the housing and feeding the continuous light guide through the through hole. A diamond saw, e.g. a linear saw with diamond impregnated wire blade or a rotational/wheel saw with diamond wheel and/or laser ablation, can then be used to cut and/or remove a portion of the continuous light guide to form a first and second light guide.

Figure 1B:
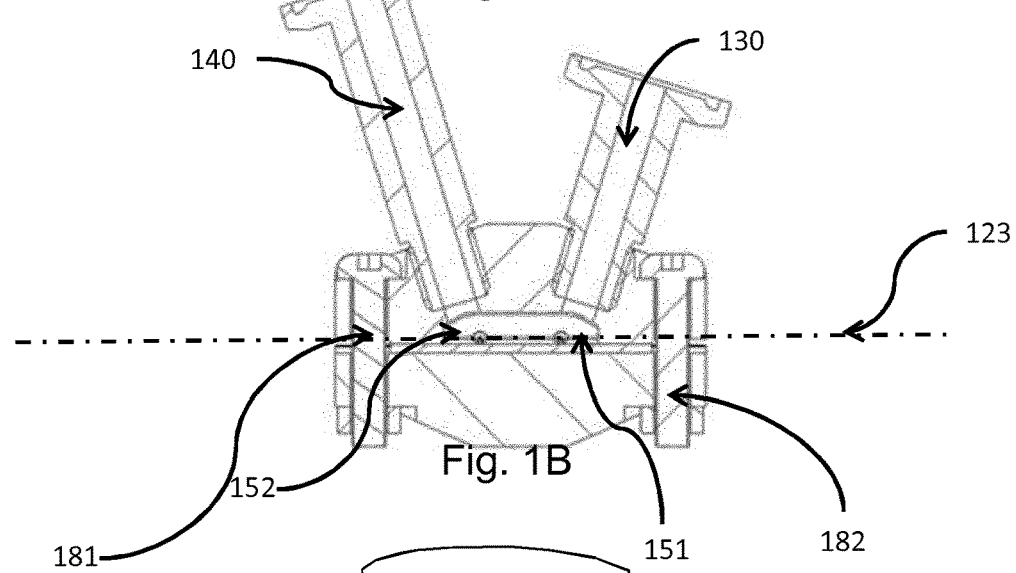

FIG. 1B shows a vertical section side view of an optical flow cell 100 according to an embodiment of the present invention. The optical flow cell 100 may further comprise an inlet 130 arranged and/or configured to connect a first outer surface area of the housing 110 to a first end 151 of the fluid channel and an outlet 140 arranged to connect a second outer surface area to a second end 152 of the fluid channel. The first and second outer surface area may be formed as connectors configured for receiving a matching connector comprising a fluid tube for leading fluid to/from the optical flow cell 100.

An advantage of this embodiment is that the optical flow cell measurement complexity can be further reduced and setup times for measurements can further be reduced as the inlet 130 and outlet 140 forms a part of the housing 110 and will be disposed together with the housing. Thus, the means for leading fluid to and from the optical flow cell 100 will not require cleaning or service operations.

Figure 1C:
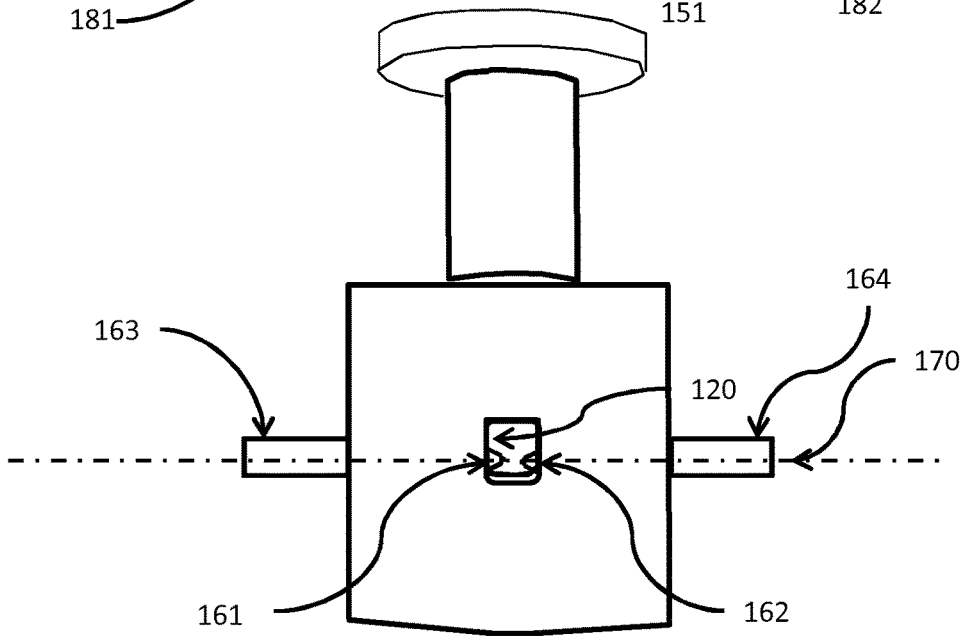

FIG. 1C shows a vertical section end view of an optical flow cell 100 according to an embodiment of the present invention. The optical flow cell 100 may further comprise a first light guide 161, e.g. an optical fiber, and a second light guide 162 concentrically arranged along a second axis 170 and on opposite side walls of the fluid channel. In an example, the first and second light guide, e.g. optical fibers, are formed by inserting a continuous light guide into the optical flow cell housing along a second axis. A portion of the continuous light guide is then cut and/or removed by using a diamond saw and/or laser ablation, in a nominal environment, adjacent to a first side wall of the fluid channel to form a first light guide, e.g. having an exit surface where light is emitted, and cut adjacent to a second opposing side wall of the fluid channel to form a second light guide having an entrance surface where the emitted light is received. In a further example the portion of the continuous light guide may be cut and/or removed in a single step, e.g. by using a diamond saw and/or laser ablation device with a cutting width corresponding to the path length or distance d. In one or more embodiments, additional steps of grinding or polishing the exit and entrance surface may further be performed. After cutting is performed, the exit surface and the entrance surface are separated by a path length and/or distance. The first light guide 161 may be configured for receiving emitted light within a bandwidth, e.g. extreme ultraviolet, ultraviolet, near ultraviolet, visible light, near Infrared, mid infrared, far infrared, from a light generator 221. The second light guide 162 may be configured for receiving the emitted light from the first light guide 161, after it has traversed the fluid channel, and emitting the received emitted light to an absorption value generator 222 configured to receive reference light directly from the light generator 221, e.g. via a third light guide, and received light from the optical flow cell 100, i.e. from the second light guide 162. In an embodiment, the first axis 123 and the second axis 170 intersect each other. In a further embodiment, the first axis 123 and the second axis 170 are arranged perpendicular to each other.

In an embodiment, the first light guide comprises an exit surface, where light is emitted. The exit surface may be arranged adjacent to a first side wall 121 of the fluid channel, e.g. protruding from the first side wall of the fluid channel. The first side wall 121 may be one of the opposite side walls of the fluid channel described above, as further described in relation to FIG. 1C. The second light guide may comprise an entrance surface, where the emitted light is received, i.e. from the exit surface. The entrance surface may be arranged adjacent to a second opposing side wall 122 of the fluid channel. The second side wall 122 may be the other one of the opposite side walls of the fluid channel described above. In one embodiment, the exit surface and the entrance surface may be separated by a path length and/or distance d. The path length and/or distance d may be equal to a nominal distance when the optical flow cell 100 is subjected to a nominal environment, e.g. an average temperature of 20° C. and average pressure at 1013.25 millibars. In an example, the path length and/or distance d is 0.2 mm at a temperature of the optical flow cell 100 of 20 degrees Celsius. In an example a nominal light absorption value may be calculated for a fluid at 20° C. It is understood that, when the temperature of the optical flow cell 100 changes, the path length and/or distance d and the corresponding absorption value will change accordingly due to thermal expansion.

In an embodiment, the first light guide 161 is enclosed in a first connector part 163 and/or the second light guide 162 is enclosed in a second connector part 164. The first and/or second connector part may comprise a body having an outer end configured to receive an optical connector, a through bore and/or through channel configured for receiving the first/second light guide.

An advantage of this embodiment is at least that the complexity of and time required to setup a measurement is reduced as the the optical flow cell may be connected to the light generator 221 and/or the absorption value generator 222 using standard optical connectors.

In an embodiment, the optical flow cell may also be connected directly to the light generator 221 and/or the absorption value generator 222.

In an embodiment, the optical flow cell 100 further comprises a first fastener arranged to fasten or secure the first connector part 163 to the housing 100 and a second fastener arranged to fasten or secure the second connector part 164 to the housing 110, e.g. in the form of locking screws, an adhesive or a welding. The first and/or second fastener is/are preferably a releasable fastener/s. An advantage of this embodiment is that cost, complexity of and time required of manufacturing the optical flow cell 100 may be reduced.

Figure 2A:
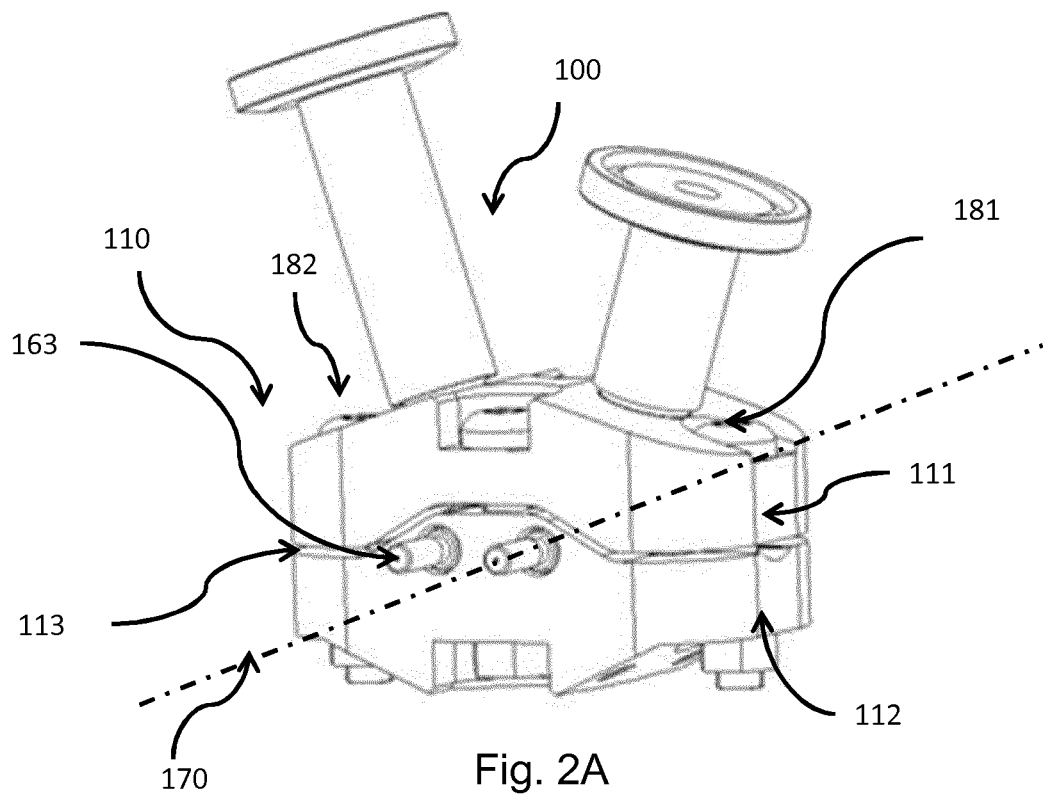
FIG. 2A-C shows details of an optical flow cell according to one or more further embodiments of the present invention.

FIG. 2A shows a side view of an optical flow cell 100 according to an embodiment of the present invention. In an embodiment, the housing comprises at least a first part 111, a second part 112 and a seal 113 located between the first and the second part 111, 112. In an embodiment, the first part 111 and/or the second part 112 is/are configured to form the enclosed and elongated fluid channel 120 arranged along the first axis 123, the fluid channel 120 having an open side, and the corresponding first part 111 and/or the second part 112 is configured to close the open side of the fluid channel 120. In an embodiment, the the fluid channel 120 is configured with an arcuate channel wall opposite the open side. In an embodiment, the first part 111 and/or the second part 112 comprises the inlet 130 and/or the outlet 140 further described in relation to FIG. 1B.

In an embodiment, the first part 111 and/or the second part 112 comprise/s the first light guide 161 and/or the second light guide 162 as further described in relation to FIG. 1C. An advantage of this embodiment is that complexity of forming the first and second light guide by cutting of the continuous light guide is reduced as the first and second part may be separated before performing cutting.

Optionally, the optical flow cell 100 may further comprise one or more fastening means 181, 182 configured to mount and/or secure and/or hold and/or secure the at least first part 111, second part 112 and the seal 113 to each other. An advantage of this embodiment is that complexity of assembly of the optical flow cell 100 is reduced.

In an embodiment, the first part 111 and/or the second part 112 are single unitary pieces. An advantage of this embodiment is that probability of fluid leakage is reduced. A further advantage is that the first and second parts may be moulded for low cost.

The single unitary pieces are affected, for example by thermal influences, more than more expensive materials used in some conventional optical flow cells, which may be made from titanium. The computer implemented method for measurement compensation/absorption value compensation further described in relation to FIG. 6 may be employed to counter these environmental effects and to account for possible manufacturing variances in the path length d.

Figure 2B:
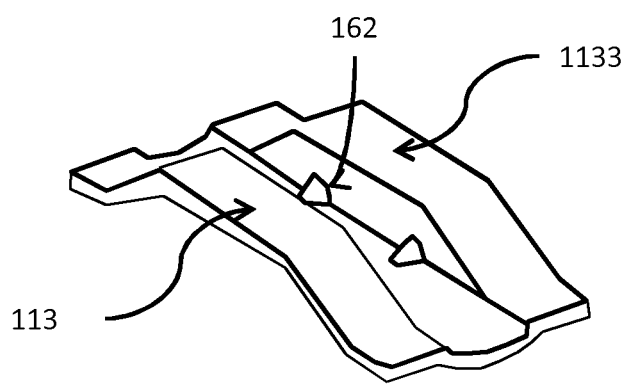

FIG. 2B shows a perspective view of the seal 113 according to an embodiment of the present invention. The seal 113 may be made from an elastomer. The seal 113 may enclose edges of opposing surfaces of the first and second parts 111, 112. The seal 113 may comprise a saddle shaped surface 1133, where the length direction of the saddle shaped surface is perpendicular to the first axis 123. The advantage of the saddle shape is that the seal is centered in relation to the first and second part 111, 112.

The first and second parts 111, 112 may further have a saddle shape and/or comprise a saddle shaped surface, where the length direction of the saddle shape and/or saddle shaped surface is perpendicular to the first axis 123. The saddle shape and/or saddle shaped surface of the first part 111 may further be configured to fit and/or closely match the saddle shape and/or saddle shaped surface of the second part 112 when the second part 112 is received by the first part.

Figure 2C:
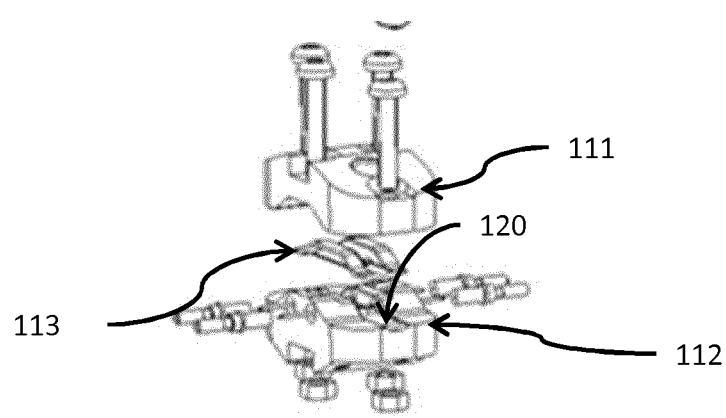

FIG. 2C shows an exploded view of an optical flow cell 100 according to an embodiment of the present invention. In this embodiment, an optical flow cell 100 is provided that comprises a fluid flow path and/or a fluid channel 120 formed in a housing part and/or a second part 112 and extending along an axis and/or the first axis 123. The housing part 112 is further supporting opposed light guides 161, 162 on opposed walls 121, 122 of the fluid flow path and/or the fluid channel 120. The fluid flow path and/or the fluid channel 120 may be open at least on a side generally parallel with the axis and/or the first axis 123 for exposing said light guides. The fluid flow path and/or a fluid channel 120 may preferably have open ends, which allow access to removing a portion of a continuous light guide to form the opposed light guides 161, 162, e.g. to a cutting wheel or laser cutter during manufacture. The open side of the flow path and/or the fluid channel 120 may be closeable by a further housing part and/or a first part 111 to form the flow cell. In an example, the housing part and/or second part 112 is configured to form the fluid flow path and/or a fluid channel 120 extending along the first axis 123, the fluid channel 120 having an open side. The corresponding further housing part and/or first part 111 is configured to close the open side of the fluid flow path and/or a fluid channel 120. In an embodiment, the the fluid flow path and/or a fluid channel 120 is configured with an arcuate channel wall opposite the open side.

Figure 3A:
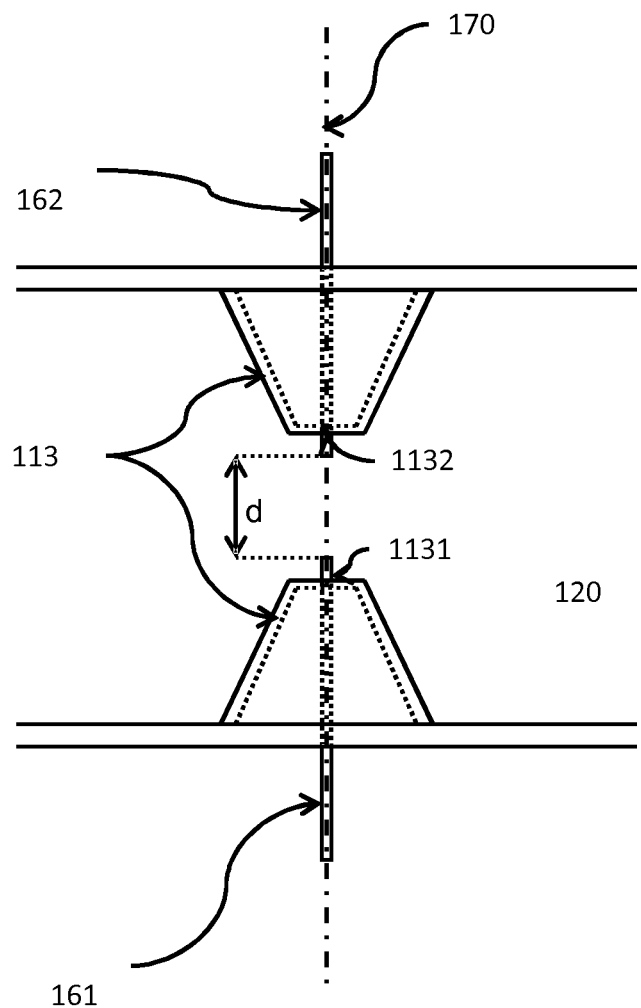
FIGS. 3A and 3B illustrates details of a seal according to an embodiment of the present invention.

FIG. 3A shows detailed plan view of the seal 113 according to an embodiment of the present invention. The seal 113 may further comprise a first and second bore 1131, 1132 arranged on the second axis 170, wherein the first bore 1131 is arranged to allow the first light guide 161 to protrude through the first bore 1131 and the second light guide 162 is arranged to protrude through the second bore 1132 such that the exit surface of the first light guide 161 and the entrance surface of the second light guide 162 is separated by a path length and/or distance d. The first light guide 161 and the second light guide 162 may be arranged to protrude into the fluid channel 120. The advantage of this embodiment is that the seal prevents fluid from leaking out along the the first light guide 161 and/or the second light guide 162.

Figure 3B:
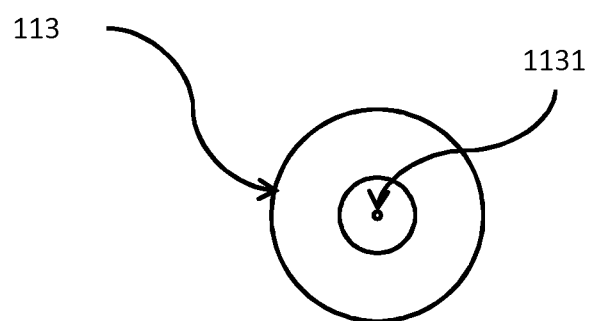

FIG. 3B shows detailed front view of the first bore 1131 comprised in the seal 113.

Figure 4:
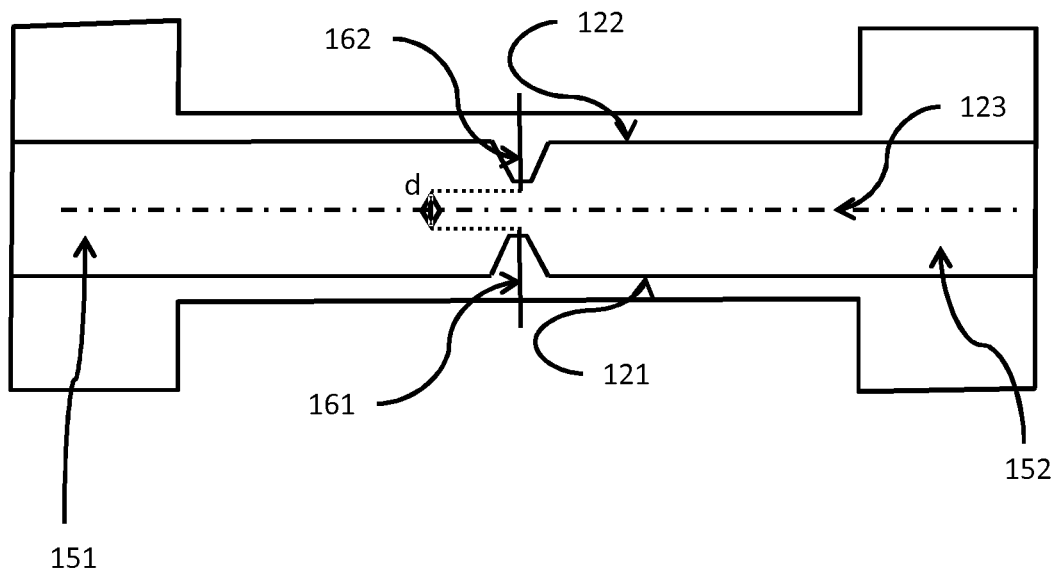
FIG. 4 illustrates details of a fluid channel according to an embodiment of the present invention.

FIG. 4 shows detailed plan view of the fluid channel 120 according to an embodiment of the present invention. The fluid channel 120 comprises a first side wall 121 and a second side wall 122 of the opposite side walls previously described. The exit surface of the first light guide 161 is arranged adjacent to the first side wall 121 of the fluid channel 120, e.g. protruding from the first side wall of the fluid channel. The entrance surface of the second light guide 162 is arranged adjacent to the second opposing side wall 122 of the fluid channel 120. The exit surface and the entrance surface are separated by a path length and/or distance d. FIG. 4 also schematically illustrates the location of the first end 151 of the fluid channel where the inlet 130 connects to and the second end 152 of the fluid channel where the outlet 140 connects to.

Figure 5:
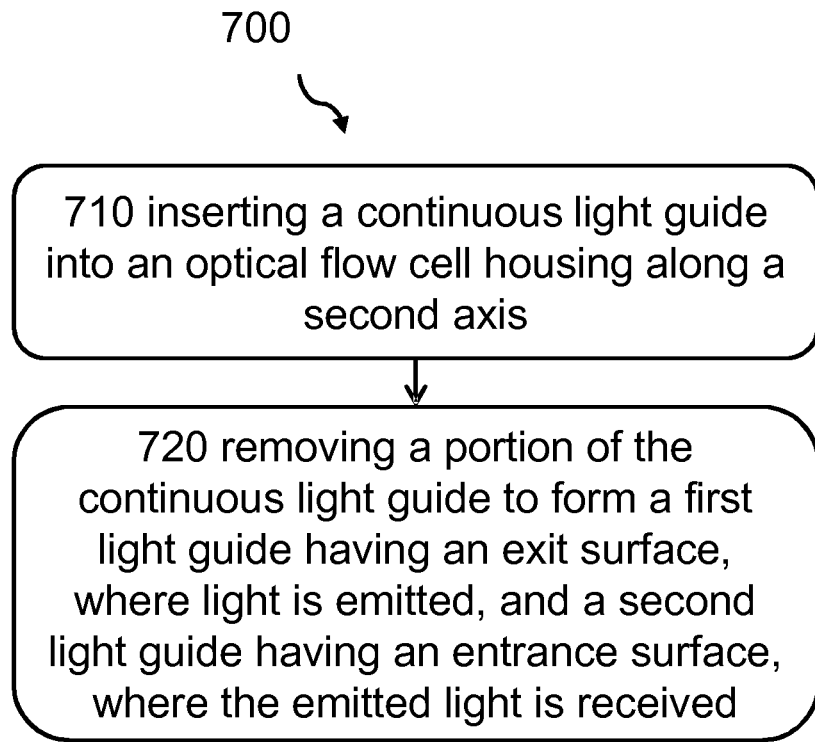
FIG. 5 shows a method of producing the optical flow cell according to an embodiment of the present invention.

FIG. 5 shows a method of producing the optical flow cell according to an embodiment of the present invention. The method comprising:

STEP 710: inserting a continuous light guide into an optical flow cell housing 110 along a second axis 170.

STEP 720: removing a portion of the continuous light guide to form a first light guide 161 having an exit surface, where light is emitted, and a second light guide 162 having an entrance surface, where the emitted light is received. Where the portion have a length equal to a distance d such that the exit surface and the entrance surface after removing the portion is separated by the distance (d). Preferably removing the portion is performed at and/or in the nominal environment such that the path length and/or distance d is equal to a nominal distance. The portion of the continuous light guide removed is comprised within the fluid channel 120. The optical flow cell housing 110 may be forming an enclosed and elongated fluid channel 120 arranged along a first axis 123 as further described in relation to FIGS. 1A-C. The second axis 170 may be arranged perpendicular to the first axis 123.

In an embodiment, removing 720 the portion of the continuous light guide is performed by cutting the continuous light guide adjacent to the first side wall 121 of the fluid channel 120 and cutting the continuous light guide adjacent to the second opposing side wall 122 of the fluid channel 120.

In an embodiment, removing 720 the portion of the continuous light guide is performed in a motion along the first axis 123 and perpendicular to the second axis 170. In a further embodiment, removing 720 the portion of the continuous light guide is performed in a motion perpendicular to the first axis 123 and perpendicular to the second axis 170.

In an embodiment, the method further comprises assembling the first part 111, the second part 112 and the seal 113 located between the first and the second part 111, 112 to an optical flow cell housing 110.

Figure 6:
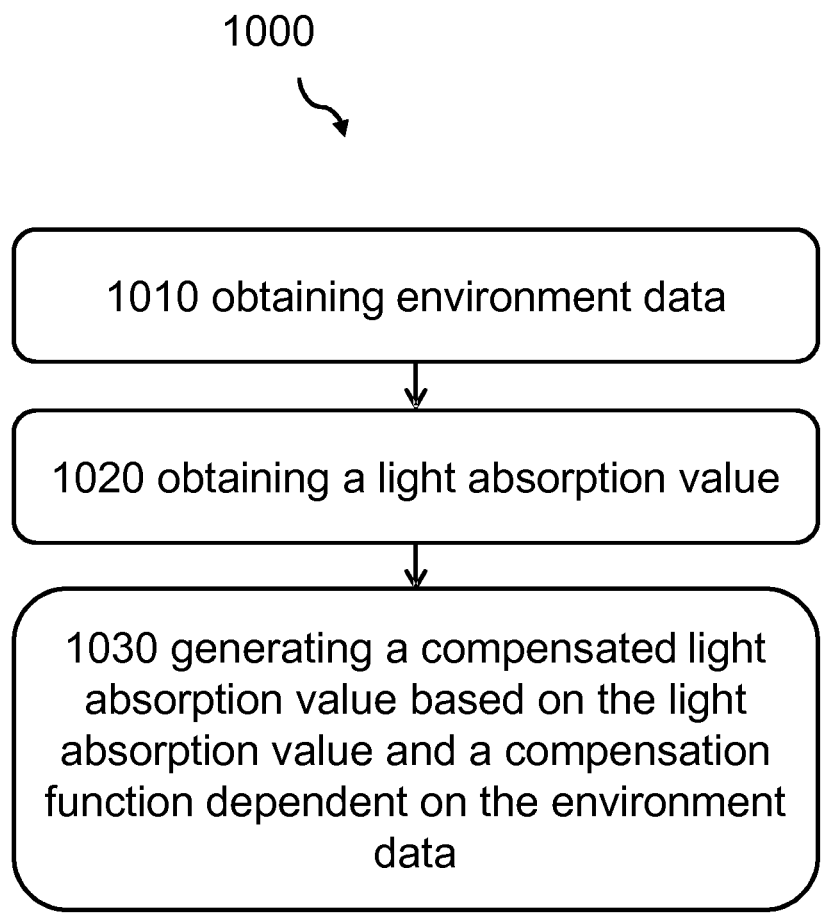
FIG. 6 shows a method performed by measuring device according to an embodiment of the present invention.

FIG. 6 shows a method 1000 performed by a measuring device 300 comprising the optical flow cell 100 according to any of the embodiments described herein. The method comprising:

STEP 1010: obtaining environment data indicative of an environment the optical flow cell 100 has been subjected to. The environment data may be received from an environment sensor or retrieved from the memory.

STEP 1020 obtaining a light absorption value of the optical flow cell 100 indicative of absorption of light emitted from an exit surface of the first light guide to an exit surface of the second light guide. The exit surface and the entrance surface may be separated by a path length and/or distance d. Obtaining a light absorption value may comprise retrieving the light absorption value from the memory, receiving the light absorption value from an external node and/or device or receiving the light absorption value from the absorption value generator 222.

STEP 1030: generating a compensated light absorption value based on the light absorption value and a compensation function dependent on the environment data.

In an embodiment, the compensation function compensates for variations of the path length and/or distance d dependent on the environment data. The environment data may be indicative of one or more of:

temperature of the optical flow cell,
ambient temperature,
the optical flow cell being subjected to gamma irradiation, or
the optical flow cell being subjected to autoclaving.

In one example, the optical flow cell 100 is operating in 60° C. of ambient temperature, resulting in a reduced path length and/or distance d. The above described method compensates the light absorption value for the reduced path length and/or distance d, thus resulting in an improved compensated light absorption value and improved measurement quality. In yet an example, the compensation function is obtained by measuring light absorption value at different temperatures. The measured light absorption values at different temperatures may then be used to and generate a compensation table and/or compensation function based on the obtained result.

In yet an example, the optical flow cell 100 has been subjected to gamma irradiation and/or autoclaving, resulting in an altered thermal expansion coefficient and/or reduced path length and/or distance d. The above described method compensates the light absorption value for the altered thermal expansion coefficient and/or the reduced path length and/or distance d, thus resulting in an improved compensated light absorption value and improved measurement quality.

The advantage of this embodiment is that the quality of measurements obtained using the optical flow cell 100 is improved. In particular with regards to the environment the optical flow cell 100 has been subjected to, such as ambient temperature, having been subjected to gamma irradiation and/or autoclaving.

Figure 7:
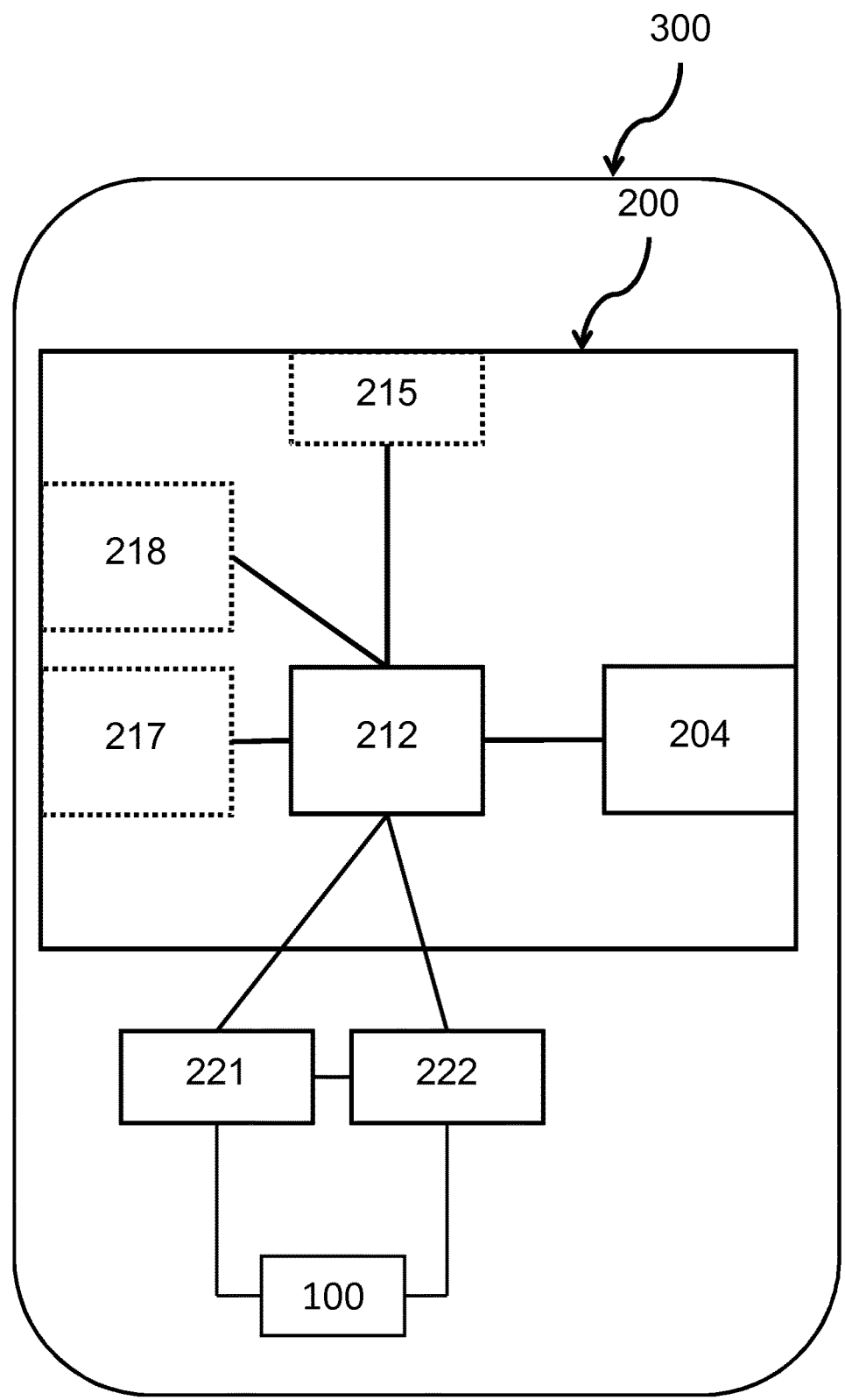
FIG. 7 shows a measuring device according to an embodiment of the present invention.

FIG. 7 shows a measuring device 300 according to an embodiment of the present invention. The measuring device 300 may be configured for compensating a light absorption value measured in the optical flow cell 100 according to any of the embodiments described herein. The measuring device 300 may comprise a light generator 221, e.g. one or more Light Emitting Diodes (LED), Organic Light-Emitting Diodes, Polymer Light-Emitting Diodes, Active-Matrix Organic Light-Emitting Diodes, Light-emitting electrochemical cell, Electroluminescent wires, Field-induced polymer electroluminescent or Lasers, configured to emit light within a bandwidth to the first light guide. The measuring device 300 may further comprise an absorption value generator 222 configured to receive reference light from the light generator 221 and received light from the optical flow cell 100 and generate a light absorption value. The measuring device 300 may further comprise a flow cell control unit 200, the unit comprising a processor 212 and a memory 215, said memory containing instructions executable by said processor, whereby said flow cell control unit 200 is operative and/or configured to perform the method of any of the corresponding methods described herein.

The absorption value generator 222 may comprise a first photodiode and/or light sensor configured to receive reference light from the light generator 221 and to generate a first signal indicative of the amplitude of the reference light. The absorption value generator 222 may further comprise a second photodiode and/or light sensor configured received light from the optical flow cell 100, e.g. from the entrance surface and to generate a second signal indicative of the amplitude of the received light from the optical flow cell 100. The absorption value generator 222 may further comprise a differentiator configured to receive the first and second signal and generate a light absorption value. The absorption value generator 222 may further be configured to send the light absorption value to the flow cell control unit 200. The measuring device 300 may be in the form of a server, an on-board computer, an digital information display, a stationary computing device, a laptop computer, a tablet computer, a handheld computer, a wrist-worn computer, a smart watch, a PDA, a Smartphone, a smart TV, a telephone, a media player, a game console, a vehicle mounted computer system or a navigation device.

The processor 212 may be communicatively coupled to a transceiver 204 for wired or wireless communication. Further, the measuring device 300 may further comprise at least one optional antenna (not shown in the figure). The antenna may be coupled to the transceiver 204 and is configured to transmit and/or emit and/or receive a wireless signals in a wireless communication system. In one example, the processor 212 may be any of processing circuitry and/or a central processing unit and/or processor modules and/or multiple processors configured to cooperate with each-other. Further, the measuring device 300 may further comprise a memory 215. The memory 215 may contain instructions executable by the processor to perform the methods described herein. The processor 212 may be communicatively coupled to a selection of any of the transceiver 204 and the memory 215. The measuring device 300 may be configured to receive the absorption value/s directly from the absorption value generator 222 or via a wired and/or wireless communications network (not shown in the figure).

In one or more embodiments the measuring device 300 may further comprise an input device 117, configured to receive input or indications from a user and send a user-input signal indicative of the user input or indications to the processing means 112. In one or more embodiments the measuring device 300 further comprises a display 118 configured to receive a display signal indicative of rendered objects, such as text or graphical user input objects, from the processing means 112 and to display the received signal as objects, such as text or graphical user input objects. In one embodiment the display 118 is integrated with the user input device 117 and is configured to receive a display signal indicative of rendered objects, such as text or graphical user input objects, from the processing means 112 and to display the received signal as objects, such as text or graphical user input objects, and/or configured to receive input or indications from a user and send a user-input signal indicative of the user input or indications to the processing means 112. In embodiments, the processor/processing means 112 is communicatively coupled to the memory 115 and/or the transceiver and/or the input device 117 and/or the display 118. In embodiments, the transceiver 104 communicates using any wired and/or wireless communication techniques known in the art, as further described below.

In embodiments, the one or more memory 115 may comprise any of a selection of a hard RAM, disk drive, a floppy disk drive, a magnetic tape drive, an optical disk drive, a CD or DVD drive (R or RW), or other removable or fixed media drive.

In an embodiment, a computer program is provided comprising computer-executable instructions for causing a measuring device 300 when the computer-executable instructions are executed on a processor/processing unit comprised in the measuring device 300, to perform any of the methods described herein.

In an embodiment, a computer program product comprising a memory and/or a computer-readable storage medium, the computer-readable storage medium having the computer program described above embodied therein. The memory and/or computer-readable storage medium referred to herein may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

In embodiments, the communications network communicate uses wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the measuring device 300 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor of the present measuring device 300 may comprise a processor and/or processing circuitry and/or processing means, e.g., one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processor" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as call processing control, user interface control, or the like.

Figure 9:
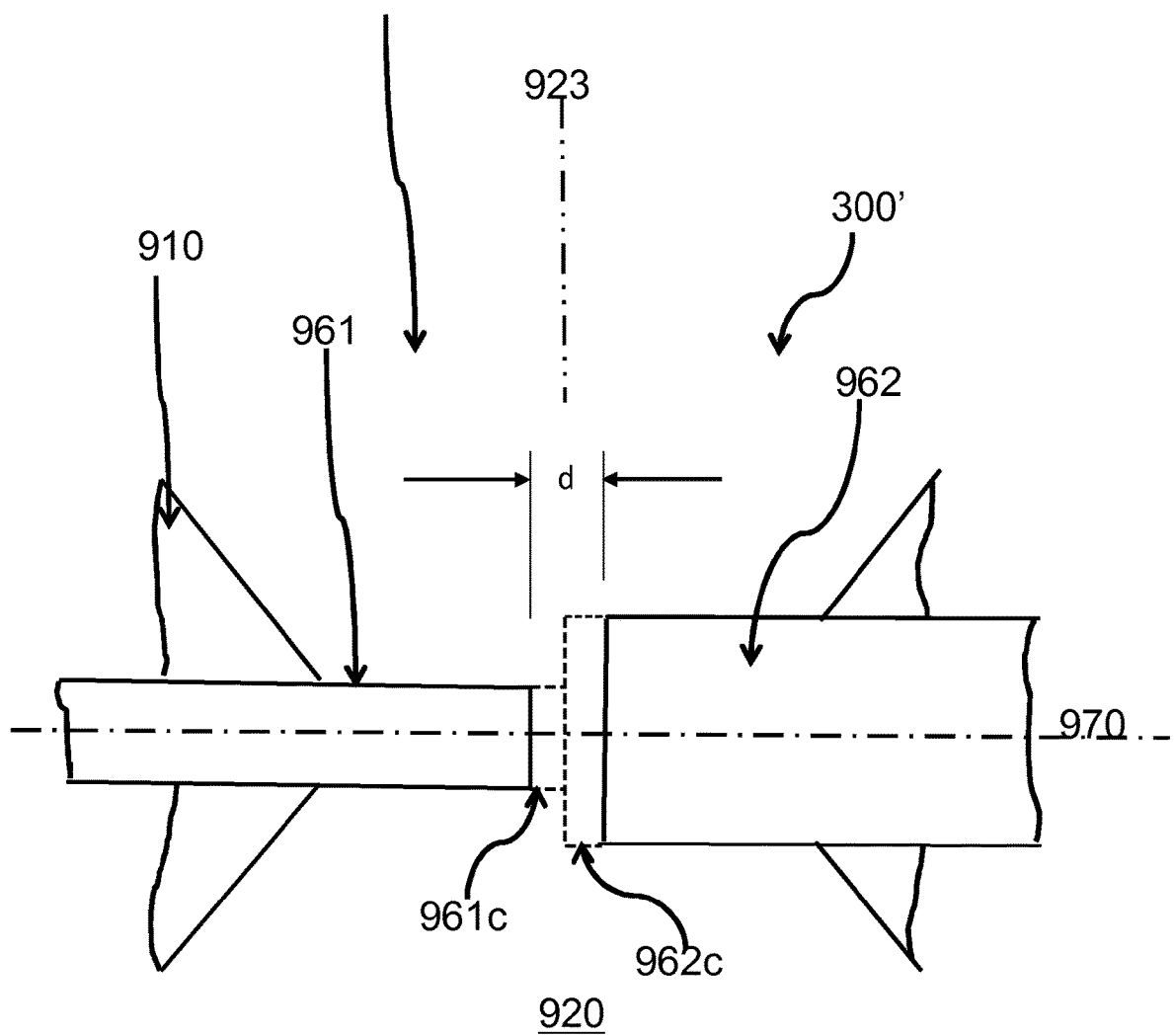

FIG. 8 shows a modified method of producing a modified optical flow cell as shown in FIG. 9.

The Method Comprises:

STEP 760: inserting opposed light guides 961 and 962 into an optical flow cell housing 910 along a second axis 970 such that they abut, or are adjacent, or closely spaced.

STEP 770: removing a portion 961c/962c one or both light guides in situ to form a sensing gap of width d. Preferably removing the portion is performed at and/or in the nominal environment such that the path length and/or distance d is equal to a nominal distance. The portion of the continuous light guide removed is comprised within the fluid channel 920. The optical flow cell housing 910 may be formed as an enclosed and elongated fluid channel arranged along a first axis 923 as further described in relation to FIGS. 1A-C. The second axis 970 may be arranged perpendicular to the first axis 923.

In an embodiment, removing 920 the portion of the continuous light guide is performed by cutting one or more, preferable both ends of the light guides, for example in the manner described above, with any of the modifications described above.

In the embodiment of FIG. 9, the optical fiber light guides 961 and 962 are different diameters, because it has been found that some light diffusion occurs when, in this case, the light emitter 961 has been cut with a diamond wheel or the like, and so the light collector (962 in this case) is made larger in diameter to capture the more diffuse light. Whilst a larger diameter is the preferred way to capture more light, it would be possible to use a larger surface area on the surface which capture the light. Other features of this embodiment are as described above in relation to the other embodiments.

Finally, it should be understood that the invention is not limited to the embodiments described above, but also relates to and incorporates all embodiments within the scope of the appended independent claims.

The invention claimed is:

1. An optical flow cell comprising:
   a housing forming an enclosed and elongated fluid channel arranged along a first axis;
   a first light guide; and
   a second light guide generally concentrically arranged along a second axis and on opposite side walls of the fluid channel, said first and second light guides having ends removed in situ to provide a sensing gap,
   wherein the housing comprises at least a first part, a second part and a seal located between the first and the second part, and
   wherein the first part is configured to form the enclosed and elongated fluid channel arranged along the first axis, the fluid channel having an open side, and the corresponding second part is configured to close the open side of the fluid channel.

2. The optical flow cell according to claim 1, wherein the first light guide comprises an exit surface, where light is emitted, and wherein the second light guide comprises an entrance surface, where emitted light is received, wherein the exit surface area is smaller than the entrance surface area as a result of a diameter of the first light guide being smaller than a diameter of the second light guide.

3. The optical flow cell according to claim 1, wherein the seal encloses edges of opposing surfaces of the first and second parts and/or the seal comprises a first and second bore arranged on the second axis, wherein the first bore is arranged to allow the first light guide to protrude through the first bore and the second light guide is arranged to protrude through the second bore.

4. The optical flow cell according to claim 1, wherein the first light guide is enclosed in a first connector part and the second light guide is enclosed in a second connector part.

5. The optical flow cell according to claim 4, further comprising:
   a first fastener arranged to fasten or secure the first connector part to the housing; and
   a second fastener arranged to fasten or secure the second connector part to the housing.

6. A method of producing the optical flow cell according to claim 1, the method comprising:
   inserting opposed first and second light guides into an optical flow cell housing along a second axis such that their ends are abutted, adjacent, or closely spaced;
   removing one or both end portions of the continuous lights guide in situ to form a sensing gap of a width (d).

7. The method according to claim 6, wherein the removing of portions of the light guides is performed by cutting the light guides adjacent to a first side wall of the fluid channel and cutting the continuous light guide adjacent to a second opposing side wall of the fluid channel.

8. The method according to claim 6, wherein the removing of a portion of the continuous light guide is performed in a motion along the first axis and perpendicular to the second axis.

9. The method according to claim 6, wherein the removing of a portion of the continuous light guide is performed in a motion perpendicular to the first axis and perpendicular to the second axis.

10. The method according to claim 6, wherein the removing is performed using a diamond saw or laser ablation.

11. The optical flow cell according to claim 1, wherein the first light guide and the second light guide are optical light guides.

12. The optical flow cell according to claim 1, wherein the seal defines a saddle shaped surface, where a length direction of the saddle shaped surface is perpendicular to the first axis.

13. The optical flow cell according to claim 1, wherein the first housing part and the second housing art are respectively single unitary pieces.

14. An optical flow cell comprising:
a housing forming an enclosed and elongated fluid channel arranged along a first axis;
a first light guide; and
a second light guide generally concentrically arranged along a second axis and on opposite side walls of the fluid channel, said first and second light guides having ends removed in situ to provide a sensing gap,
wherein the housing comprises at least a first part, a second part and a seal located between the first and the second part,
wherein the first part is configured to form the enclosed and elongated fluid channel arranged along the first axis, the fluid channel having an open side, and the corresponding second part is configured to close the open side of the fluid channel, and
wherein the first axis and the second axis intersect each other, such that the first axis and the second axis are perpendicular to each other.

15. A method of producing the optical flow cell according to claim 14, the method comprising:
inserting opposed first and second light guides into an optical flow cell housing along a second axis such that their ends are abutted, adjacent, or closely spaced;
removing one or both end portions of the continuous lights guide in situ to form a sensing gap of a width (d).

* * * * *